(12) United States Patent
Kustosch

(10) Patent No.: US 7,480,562 B2
(45) Date of Patent: Jan. 20, 2009

(54) METHOD FOR OPERATING A VEHICLE

(75) Inventor: Mario Kustosch, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 701 days.

(21) Appl. No.: 10/896,184

(22) Filed: Jul. 21, 2004

(65) Prior Publication Data

US 2005/0021226 A1    Jan. 27, 2005

(30) Foreign Application Priority Data

Jul. 25, 2003    (DE)    ................................ 103 33 962

(51) Int. Cl.
| | |
|---|---|
| G06F 7/00 | (2006.01) |
| G05D 1/00 | (2006.01) |
| G05D 3/00 | (2006.01) |
| G01C 21/00 | (2006.01) |
| G06F 17/10 | (2006.01) |
| G06F 7/78 | (2006.01) |

(52) U.S. Cl. ............................ 701/205; 701/1; 701/200; 701/301; 701/51; 701/70; 180/65.2; 180/65.8; 180/14.4

(58) Field of Classification Search ........................ None
See application file for complete search history.

(56) References Cited

U.S. PATENT DOCUMENTS

| | | | | |
|---|---|---|---|---|
| 5,841,366 | A * | 11/1998 | Yamamoto et al. | 340/901 |
| 5,913,910 | A * | 6/1999 | Ochi et al. | 701/1 |
| 5,925,087 | A * | 7/1999 | Ohnishi et al. | 701/70 |
| 5,995,902 | A * | 11/1999 | Monson | 701/202 |
| 6,292,752 | B1 * | 9/2001 | Franke et al. | 701/300 |
| 6,317,693 | B2 * | 11/2001 | Kodaka et al. | 701/301 |
| 6,377,889 | B1 * | 4/2002 | Soest | 701/207 |
| 6,381,524 | B1 * | 4/2002 | Kuragaki et al. | 701/36 |
| 6,427,108 | B1 * | 7/2002 | Kanasugi et al. | 701/51 |
| 6,505,107 | B2 * | 1/2003 | Kuragaki et al. | 701/36 |
| 6,643,578 | B2 * | 11/2003 | Levine | 701/70 |
| 6,751,547 | B2 * | 6/2004 | Khosla | 701/200 |
| 7,124,027 | B1 * | 10/2006 | Ernst et al. | 701/301 |

FOREIGN PATENT DOCUMENTS

| | | |
|---|---|---|
| DE | 195 05 288 | 8/1995 |
| DE | 19505288 | 8/1995 |
| DE | 100 06 246 | 8/2001 |
| DE | 10006246 | 8/2001 |
| DE | 102 26 678 | 12/2003 |

(Continued)

OTHER PUBLICATIONS

"Taschenbuch der Mathematik" ("Paperback Book of Mathematics")(Bronstein, Semendjajew, 25th edition, p. 758).

Primary Examiner—Khoi H. Tran
Assistant Examiner—Ian Jen
(74) Attorney, Agent, or Firm—Kenyon & Kenyon LLP

(57) ABSTRACT

A method for operating a vehicle, in which the method allows feedback about imminent risks. In this context, the vehicle moves on a predefined route at a current traveling velocity. A value characteristic of the vehicle movement along the predefined route is precalculated as a function of the current traveling velocity and the predefined route. A vehicle function is activated as a function of this value.

18 Claims, 3 Drawing Sheets

FOREIGN PATENT DOCUMENTS

| | | |
|---|---|---|
| EP | 0901929 | 3/1999 |
| EP | 1 074 421 | 2/2001 |
| EP | 1074421 | 2/2001 |
| EP | 0 901 929 | 11/2003 |
| JP | 2001-105932 | 4/2001 |
| JP | 2001105932 | 4/2001 |

* cited by examiner

METHOD FOR OPERATING A VEHICLE

RELATED APPLICATION INFORMATION

This application claims priority to and the benefit of German Patent Application No. 103 33 962.0, which was filed in Germany on Jul. 25, 2003, and which is hereby incorporated by reference in its entirety.

FIELD OF THE INVENTION

The present invention concerns a method for operating a vehicle.

BACKGROUND INFORMATION

There are methods for operating a vehicle, in which a route is predefined by a navigation device, and in which the vehicle moves on the predefined route at a current traveling velocity.

SUMMARY OF THE INVENTION

The exemplary method of the present invention for operating a vehicle may have the advantage that a value characteristic of the vehicle movement along the predefined route is precalculated as a function of the current traveling velocity and the predefined route, and that a vehicle function is activated as a function of this value. In this manner, a safety function may be activated when the predicted vehicle movement represents a safety risk. In addition, information as to how the driver of the vehicle should drive the vehicle as economically and/or safely as possible, based on the expected vehicle movement, may be generated for or transmitted to him. Consequently, the driving safety may be increased and the fuel consumption may be reduced, and a better or more effective exhaust-gas composition may also be attained.

It may be advantageous when a safety function, in particular an accident-prevention function, which may be in the form of a traveling-velocity limitation system, a function for occupant protection, which may provide precharging of the brake system or conditioning of at least one restraint system, or a driver-information function, which may be in the form of feedback regarding a forthcoming, critical curve, is activated as a vehicle function. In this manner, a safety risk derived from the predicted vehicle movement may be more easily or effectively minimized or reduced beforehand.

In addition, it may be advantageous when a function relating to vehicle operation, in particular along the lines of optimizing fuel consumption or exhaust-gas composition, which may be within the scope of feedback regarding the fuel consumption or exhaust gas, is activated as a vehicle function. In this manner, an optimum fuel consumption or an optimum exhaust-gas composition may be produced for a predicted vehicle movement.

It may be advantageous that when the feedback is carried out or performed haptically, in particular at an accelerator pedal. In this manner, it may be ensured that the driver also senses the feedback and can initiate proper measures, for example, completely releasing the accelerator pedal.

An additional advantage may be provided when a yaw rate is selected as a characteristic value for the vehicle movement along the predefined route. The yaw rate represents a reliable value, in particularly for cornering, the driving safety to be expected for the predefined route and the current traveling velocity being able to be quantified with the aid of this value.

It may also be advantageous when it is assumed that, during the calculation of the characteristic value, an accelerator pedal of the vehicle is not operated. In this manner, the safety risk may be deduced from the vehicle movement predicted by the current thrust of the vehicle and the predefined route alone, which means that a safety risk is also detected when the driver is no longer accelerating at all.

A further advantage may be provided when the route of the vehicle is predetermined, in particular by a navigation system, in the form of a set of route points, and when the path between the route points is interpolated with the aid of continuous and differentiable functions. First of all, this allows the predefined route of the vehicle to be approximated in a particularly simple and complete manner, and secondly, the characteristic value for the expected vehicle movement may be derived from this predefined route with the aid of mathematical functions.

A further advantage may be provided when the characteristic value is determined as a function of a steering angle, and when the steering angle is determined as a function of a traveling-direction vector and a vector tangent to the traveling direction. In this manner, the characteristic value may take into account the windiness of the predefined route in a particularly reliable manner.

A further advantage may be provided when the traveling-direction vector is determined as a function of a radian measure of the predefined route, and when the radian measure is determined from a range of the vehicle. In this manner, the travel-direction vector may be ascertained with the aid of mathematical relationships.

A further advantage may be provided when the range of the vehicle is ascertained as a function of a vehicle acceleration, and when the vehicle acceleration is ascertained with the aid of a pulling-force equation. In this manner, the range of the vehicle may also be determined in a particularly simple and reliable manner with the aid of mathematical and physical relationships.

DETAILED DESCRIPTION

Figure 1:
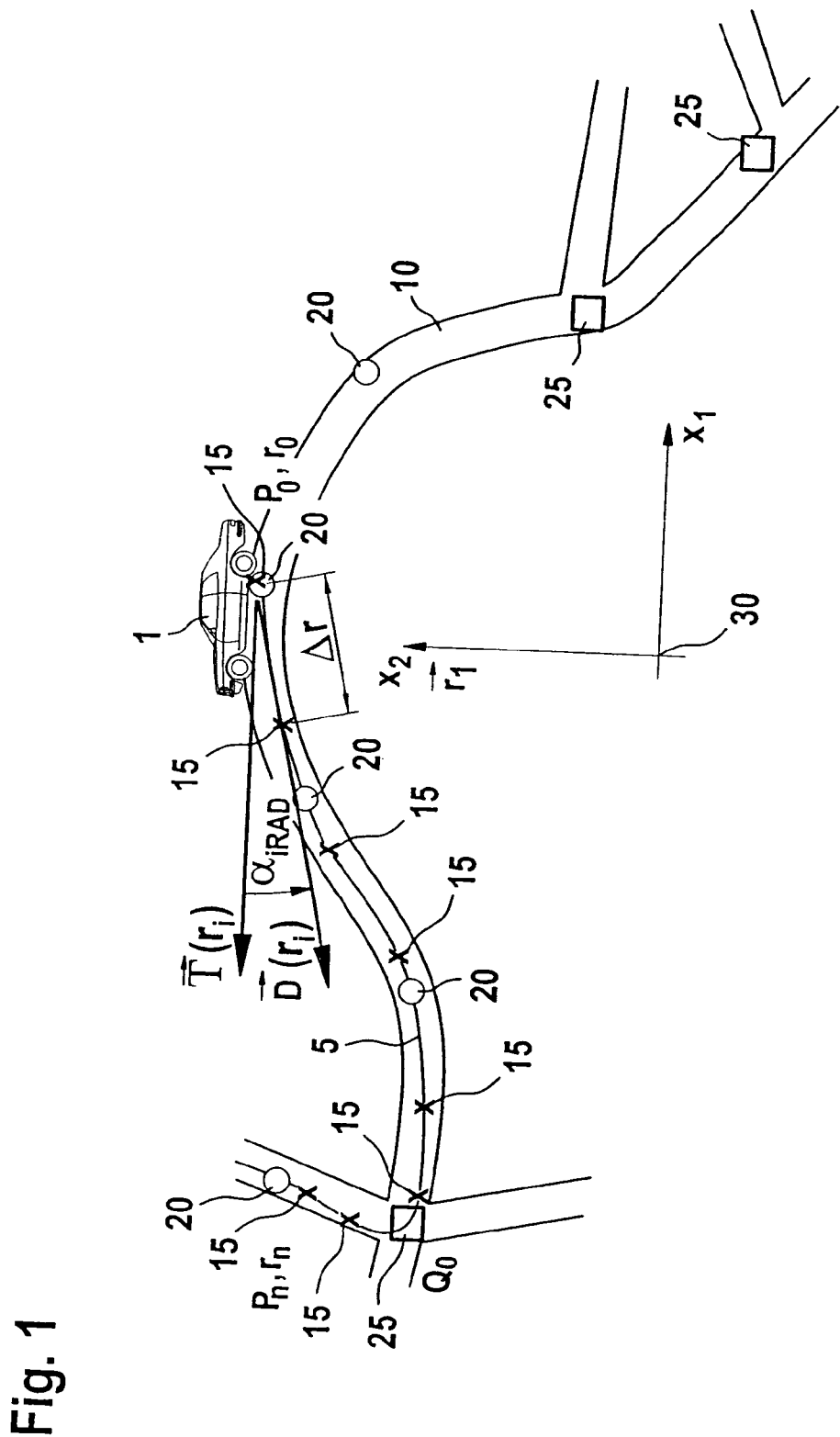
FIG. 1 shows a schematic view of a predetermined road routing for the route of a vehicle.

In FIG. 1, reference numeral 1 designates a vehicle, which moves in accordance with a predefined route 5. Predefined route 5 is based on so-called routing points 20 and route nodes 25, which are, e.g. selected by a navigation device of the vehicle in a manner known to one skilled in the art. In this context, routing points 20 mark discrete route points along the predefined route 5, and route nodes 25 designate intersections, at which predefined route 5 crosses other roads.

At a time t0, vehicle 1 is at a routing point 20, which is also designated by P0 in FIG. 1 and referred to in the following as a first routing point P0. Routing point 20 subsequently selected by the navigation device is designated in FIG. 1 by P1 and is also referred to in the following as second routing point P1. According to FIG. 1, the navigation device at least specifies routing points P0, P1, . . . , Pn, where $n \in N_0$, and it also stipulates a route node 25, which is also referred to as Q0 in the following.

The navigation device is provided with digital road data, which include, in part, a description of the network in the form of such routing points 20 and route nodes 25. The navigation device guides the driver with the aid of the set of route points and intersections, which represent the optimum connection from the current position, i.e. in this example first routing point P0, to the destination. The route points are displayed within a Cartesian coordinate system, for which the GPS signal (GPS=global positioning system) received by the navigation device supplies a reference point 30 that represents the origin of the coordinate system, as in FIG. 1.

Figure 2:
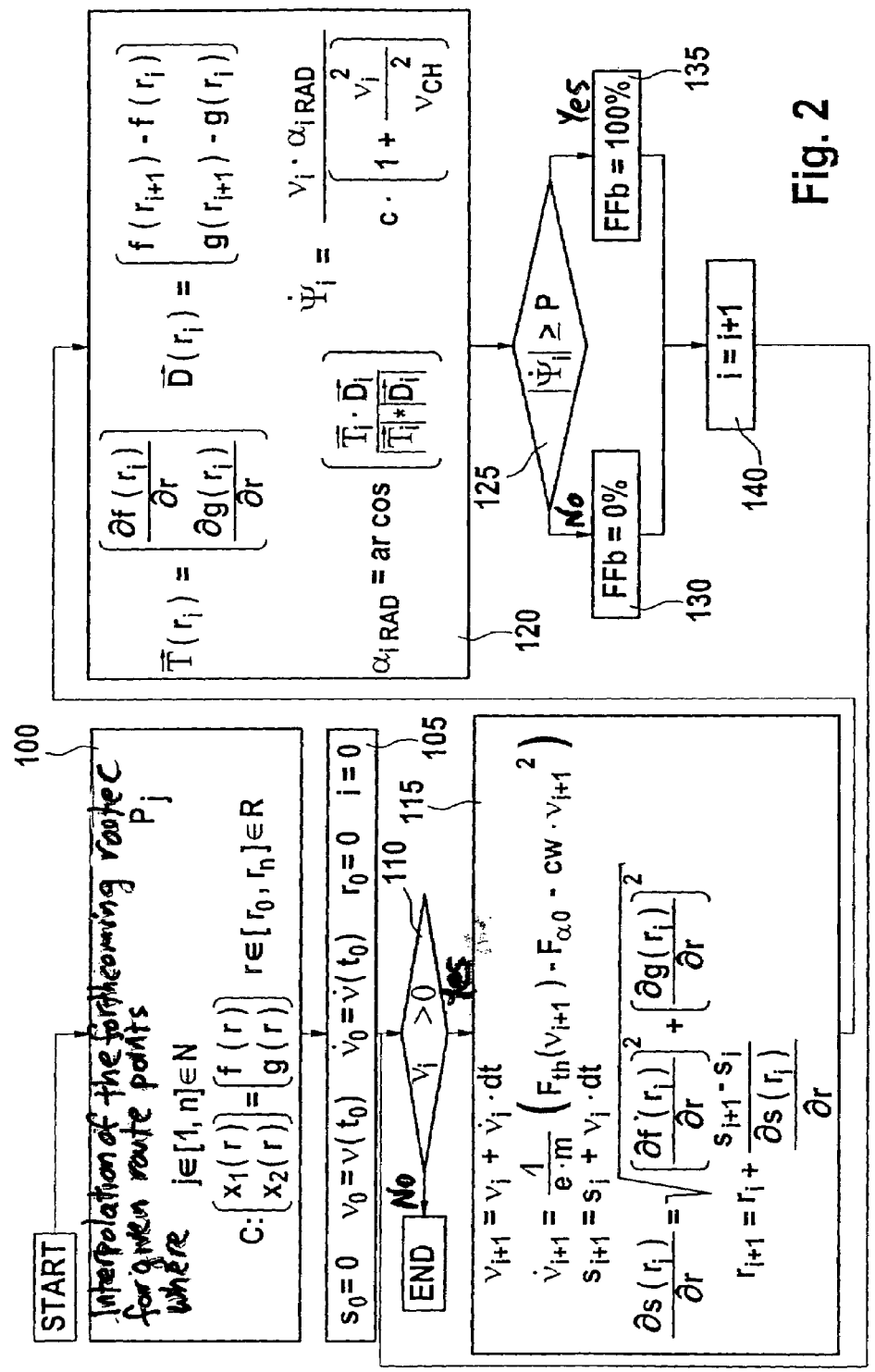
FIG. 2 shows a flowchart for an exemplary functional sequence of the method according to the present invention.

In the following, the method of the present invention is exemplarily described with the aid of a flowchart according to FIG. 2. In this context, the method of the present invention may be implemented by software and/or hardware in the engine control unit of the vehicle.

Vehicle 1 in FIG. 1 moves at velocity v(t) along predefined route 5, which is stipulated by the navigation device, using the set of routing points Pj, j=0, 1, . . . , n and route node Q0. For the sake of simplicity, route node Q0 is also interpreted below as one of routing points Pj. Since this set of points describes the route in an insufficiently accurate and non-differentiable manner, interpolation shall be carried out between routing points Pj. This occurs after the start of the program, at a program point 100. For example, splines may be used as an interpolation method, i.e. an interpolation is carried out in sections for a few points, using polynomials of low order (e.g. third degree).

An exact description of this interpolation method may be found, for example, in "Taschenbuch der Mathematik" ("Paperback Book of Mathematics")(Bronstein, Semendjajew, 25th edition, p. 758). Furthermore, it is assumed that the interpolation method yields a continuous, differentiable description of predefined route 5 in parametric form in the form of curve C:

$$C: \begin{pmatrix} x_1(r) \\ x_2(r) \end{pmatrix} = \begin{pmatrix} f(r) \\ g(r) \end{pmatrix} \quad r \in [r_0, r_n] \in R. \tag{1}$$

Points of reference 15 are generated for this interpolation, which are used for setting predefined route 5 on the basis of routing points Pj. According to FIG. 1, at least "m" points of reference 15 are provided for predefined route 5. Parameter r constitutes a radian measure, which represents a real number between radian measure r0 at first routing point P0 that may be equal to zero, and maximum, added radian measure rn for the considered, predefined route 5, at nth routing point Pn. x1 and x2 are coordinates in the Cartesian coordinate system having origin 30. All of the points on predefined route 5 may be represented by coordinates x1 and x2 in equation (1), as a function of parameter r. In this context, f(r) and g(r) are rational, continuously differentiable functions.

In addition, "s" designates the range that the vehicle has while rolling, based on the current position, i.e. under the assumption that the driver takes his or her foot away from the accelerator pedal.

At a program point 105 following program point 100, an initialization is carried out for a subsequently executed, integration routine. In this context, the initial values for the subsequent integration are indexed (or set) to 0 and correspond to the values at the time of calling up (or initiating) the integration routine. In this example, this time is time t0. Range s0 is equal to zero at the start, i.e. at time t0. At time t0, velocity v0 corresponds to the value of the sensor signal of a velocity sensor at time t0, i.e. v0=v(t0). Acceleration $\dot{v}_0$ at time t1 corresponds to the value of the differentiated velocity signal at time t0, that is:

$$\dot{v}_0 = \dot{v}(t_0)$$

Parameter r is initially equal to zero, i.e. r0=0, and an integration variable "i", which designates the ith integration step, is likewise equal to zero at time t0. Subsequently, the method branches to a program point 110. At the program point 110, it is checked if velocity vi in the ith integration step is greater than zero. If this is the case, then the method branches to program point 115, otherwise the method is ended. Therefore, the integration is aborted when the precalculated velocity for the ith integration step is less than or equal to 0. This means that no more kinetic energy is present.

An integration step is carried out or performed at program point 115. The precalculation performed in this context is based on the pulling-force equation:

$$\dot{v} = \frac{1}{e \cdot m}(F_{th}(v) - F_\alpha - cw \cdot v^2). \tag{2}$$

In this equation:
$\dot{v}$ is the vehicle acceleration,
$F_{th}(v)$ is the pushing force (or thrust) of the non-firing engine,
$F\alpha$ is the gradient-specific road resistances at time t0,
cw is the drag coefficient,
v is the vehicle velocity,
m is the vehicle mass, and
e is the mass-increase factor to compensate for the rotational inertias.

The pulling-force equation corresponds to a normal, non-linear, 2nd-order differential equation. In order to calculate range "s", the equation is solved for "v" and numerically integrated.

An integration step is made up of 3 computational operations:
a) Velocity $v_{i+1}$ current for the (i+1)th integration step is yielded from the sum of last velocity value vi and the product of the corresponding acceleration value vdoti ($\dot{v}i$) and integration time constant dt:

$$v_{i+1} = v_i + \dot{v}_i \cdot dt \tag{3}$$

For example, 500 ms may be selected for dt.
a) Calculating the acceleration from the pulling-force equation in view of the initial values or the values from the previous integration step, using the following equation:

$$\dot{v}_{i+1} = \frac{1}{e \cdot m}(F_{th}(v_{i+1}) - F_{\alpha 0} - cw \cdot v_{i+1}^2). \tag{4}$$

Figure 3:
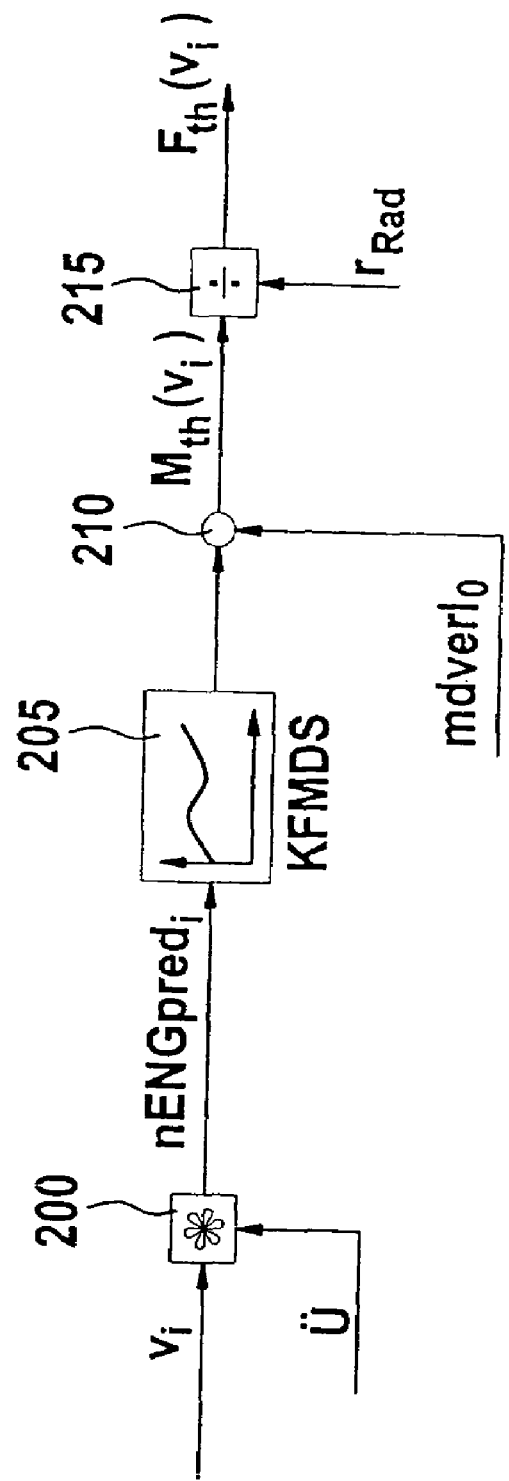
FIG. 3 shows a flowchart for determining a pushing force (or thrust) of a non-firing engine.

FIG. 3 shows how thrust $F_{th}(vi)$ is calculated as a function of velocity vi for the current integration step. In a multiplication element 200, vi is initially multiplied by overall transmission ratio Ü, which is known in the engine control unit and describes the gear ratio from the transmission input to the wheels, and therefore, vi is converted to a predicted engine speed nENGpred$_i$ for integration step "i". Characteristic curve KFMDS, which is denoted by reference numeral 205 in FIG. 3, is then addressed, using predicted engine speed nENGpred$_i$. Characteristic 205 ascertains the drag torque of the engine as a function of predicted engine speed nENGpred$_i$ and may be identified in an experiment, on a test stand, in that the engine is pulled (or driven) in an unfired state by a second engine.

In this context, the drag torque is measured by a torque-measuring hub and plotted versus the corresponding engine speed. In a summing element 210, torque demand of the ancillary components mdverl$_0$, which is known in the engine control unit, is then added to the drag torque at the time of initiating the integration, i.e. at time t0 of initiating the integration routine. Thus, thrust torque M$_{th}$(v$_i$) is yielded at the output of summing element 210. In a division element 215, this is divided by wheel radius r$_{wheel}$ known in the engine control unit, so that thrust F$_{th}$(vi), for the ith integration step is yielded at the output of division element 215. The flow chart according to FIG. 3 may also be implemented in the engine control unit in the form of software and/or hardware.

Portion Fα0 of road resistance dependent on the gradient corresponds to the value of the gradient-dependent portion of the road resistance at time t0 of the initiation of integration. It is assumed that the gradient-dependent portion Fα0 of the road resistance is measured or calculated. One option for calculating this portion Fα0 is described in German Patent Document No. 102 26 678. The gradient-dependent portion of the road resistance at time t0 is only used as an approximation for such a future portion, i.e. until a desired distance to the destination of a route selected by the navigation device is reached. In future systems, it is conceivable that the forthcoming curve of portion Fα0 along predefined route 5 will be known, e.g. as a part of the information of a new generation of navigation devices. Drag coefficient cw, the vehicle mass, and mass-increase factor "e" are known to be constant quantities. It is possible for the vehicle mass to be corrected in a manner known to one skilled in the art, using additional mass adaptation. Consequently, the vehicle acceleration may be completely determined for every integration step.

Range s$_{i+1}$ of vehicle 1 having the kinetic energy present at time t0 is yielded by the sum of the range from the previous integration step and the product of the velocity of the previous integration step and integration time constant dt, that is:

$$s_{i+1} = s_i + v_i \cdot dt \quad (5).$$

For calculated range si, corresponding value ri in the parameter representation of C according to equation (1) must be ascertained for predefined route 5. Range s$_{i+1}$ may be represented as the radian measure of curve C for ri, r$_{i+1}$, as follows:

$$s_{i+1} = (r_{i+1} - r_i) \cdot \frac{\partial s(r_i)}{\partial r} + s_i \quad (6)$$

where $$\frac{\partial s(r_i)}{\partial r} = \sqrt{\left(\frac{\partial f(r_i)}{\partial r}\right)^2 + \left(\frac{\partial g(r_i)}{\partial r}\right)^2}. \quad (7)$$

In this context, ri are the parameters for points of reference 15 of predefined route 5, where r$_i \in [r_0, r_n] \in R$. Therefore, each integration step is assigned a point of reference 15.

If one solves the above equation for r$_{i+1}$, then parameter r$_{i+1}$ of curve C is known for every range s$_{i+1}$:

$$r_{i+1} = r_i + \frac{s_{i+1} - s_i}{\frac{\partial s(r_i)}{\partial r}}. \quad (8)$$

The method then branches to a program point 120. At program point 120, tangent vector Ti at C(r$_i$) may now be calculated in integration step "i", as well. Ti describes the predicted longitudinal vehicle direction in the range or at distance si to the current position of vehicle 1, i.e. to first routing point P0:

$$\vec{T}(r_i) = \begin{pmatrix} \frac{\partial f(r_i)}{\partial r} \\ \frac{\partial g(r_i)}{\partial r} \end{pmatrix}. \quad (9)$$

It is assumed that the driver selects steering angle α$_{iWHEEL}$ in such a manner, that the course of the vehicle follows predefined route 5, i.e. that at point C(r$_i$), the driver steers for subsequent point C(r$_{i+1}$). Given this assumption, the vector of the steering direction may be calculated as the difference of C(r$_{i+1}$) and C(r$_i$):

$$\vec{D}(r_i) = \begin{pmatrix} f(r_{i+1}) - f(r_i) \\ g(r_{i+1}) - g(r_i) \end{pmatrix}. \quad (10)$$

Steering angle α$_{iWHEEL}$ may now be calculated from the scalar product of T and D:

$$\alpha_{iWHEEL} = arcos\left(\frac{\vec{T}_i \cdot \vec{D}_i}{|\vec{T}_i| \cdot |\vec{D}_i|}\right). \quad (11)$$

Consequently, the following predicted yaw rate may be calculated from the so-called single-track model:

$$\dot{\psi}_i = \frac{v_i \cdot \alpha_{iWHEEL}}{c \cdot \left(1 + \frac{v_i^2}{v_{CH}^2}\right)}. \quad (12)$$

If the predicted yaw rate $\dot{\psi}_i$ exceeds a specifiable value P, then, for example, the driver may receive, via the accelerator pedal, a haptic signal that a critical curve is forthcoming. Thus, at a program point 125 following program point 120, it is checked if the magnitude of scidoti ($\Psi_i$) of the predicted yaw rate is greater than or equal to specified value P. If this is the case, the method branches to program point 135, otherwise the method branches to program point 130. At program point 135, a maximum restoring force FFb of 100 percent is selected at the accelerator pedal. At program point 130, no restoring force is selected at the accelerator pedal. After program point 135 and program point 130, the method branches to a program point 140. At program point 140, integration variable "i" is incremented. The method subsequently branches back to program point 110.

It was described how predicted yaw rate $\Psi_i$ (or "scidoti" (or "psidoti") as also used herein) may be used to inform the driver of imminent risks on predefined route 5, using haptic signals. As an alternative, an economical or exhaust-optimized driving style may be recommended to the driver as a function of predicted yaw rate scidoti ($\Psi_i$), using such a haptic signal. When a value preselected with regard to fuel consumption is exceeded by the magnitude of scidoti ($\Psi_i$) of the predicted yaw rate, restoring force FFb on the accelerator pedal is used for recommending a more economical or more exhaust-optimized driving style. Predicted yaw rate scidoti ($\Psi_i$) may equally be used for other purposes, such as accident prevention (e.g. electronic limitation of the velocity), or for provisional occupant protection (e.g. precharging of the brake system, conditioning of airbag and seat-belt tensioners).

In this manner, a vehicle function for preventing accidents, protecting occupants, informing the driver, in particular of imminent risks, or a vehicle function relating to vehicle operation and regarding the optimization of fuel consumption or the exhaust gas, may be activated as described.

When an accelerator pedal is active, a restoring force, which the driver immediately senses at the accelerator pedal, via his foot, may be preselected by an electronic control unit (e.g. the engine control unit). This restoring force may inform one about imminent risks, such as a forthcoming, critical curve, or an optimum driving style may be recommended.

The exemplary method of the present invention provides a method for pre-calculating yaw rate scidoti ($\Psi_i$) along forthcoming route 5 on the basis of the current longitudinal velocity and the navigation data. This may be used as described, for increasing the safety and optimizing fuel consumption and exhaust gas. In this context, predicted yaw rate scidoti ($\Psi_i$) represents a characteristic value for the vehicle movement along predefined route 5.

What is claimed is:

1. A method for operating a vehicle, which moves on a predefined route at a current traveling velocity, the method comprising:
   determining a value of a current traveling velocity;
   precalculating a characteristic value of the vehicle movement along the predefined route as a function of the determined value of the current traveling velocity and the predefined route, wherein, for a particular predefined route, the characteristic value varies depending on the determined value of the current traveling velocity; and
   activating a vehicle function as a function of the characteristic value;
   wherein the vehicle function includes at least one of:
      a safety function;
      an occupant protection function including one of a precharging of a brake system and a conditioning of at least one restraint system;
      a driver-information function including providing of feedback regarding a forthcoming critical curve, the feedback being implemented in a haptic manner and at an accelerator pedal; and
      a vehicle operation function including one of optimizing fuel consumption and optimizing exhaust gas.

2. The method of claim 1, wherein a yaw rate is selected as the characteristic value.

3. The method of claim 1, wherein, during a calculation of the characteristic value, it is assumed that an accelerator pedal of the vehicle is not being operated.

4. The method of claim 1, wherein the route of the vehicle is predetermined as a set of route points, and the path between the route points is interpolated with continuous functions and differentiable functions.

5. The method of claim 4, wherein the route of the vehicle is predetermined by a navigation system.

6. The method of claim 1, wherein the characteristic value is determined as a function of a steering angel, and the steering angle is determined as a function of a traveling direction vector and a vector tangent to the traveling direction.

7. The method of claim 6, wherein the traveling direction vector is ascertained as a function of a radian measure of the predefined route, and the radian measure is ascertained from a range of the vehicle.

8. The method of claim 7, wherein the range of the vehicle is ascertained as a function of a vehicle acceleration, and the vehicle acceleration is ascertained with a pulling-force equation.

9. The method of claim 1, wherein the safety function includes an accident-prevention function.

10. The method of claim 9, wherein the accident-prevention function includes a limiting of the traveling speed.

11. The method of claim 1, wherein the vehicle function includes the occupant protection function including the precharging of the brake system.

12. The method of claim 1, wherein the vehicle function includes the driver-information function including the providing of feedback regarding a forthcoming critical curve.

13. The method of claim 1, wherein the vehicle function includes the vehicle operation including the one of the optimizing of fuel consumption and the optimizing of exhaust gas.

14. The method of claim 13, wherein the one of the optimizing of fuel consumption includes a providing of feedback relating to the fuel consumption and the optimizing of exhaust gas includes a providing of feedback relating to the exhaust gas.

15. The method of claim 14, wherein the feedback is implemented in a haptic manner.

16. The method of claim 14, wherein the feedback is implemented at the accelerator pedal.

17. The method of claim 1, wherein the characteristic value varies depending on the predefined route even where a currently traveled route does not deviate from the predefined route.

18. The method of claim 1, wherein whether or not the vehicle function is activated depends upon the precalculated characteristic value.

* * * * *